Nov. 4, 1924.

N. S. BUGG

PAN LIFTER

Filed June 7, 1922

1,514,309

Inventor
Nannie S. Bugg
By Lancaster and Allwine
Her Attorneys

Patented Nov. 4, 1924.

1,514,309

UNITED STATES PATENT OFFICE.

NANNIE SUE BUGG, OF ROANOKE RAPIDS, NORTH CAROLINA.

PAN LIFTER.

Application filed June 7, 1922. Serial No. 566,616.

*To all whom it may concern:*

Be it known that I, NANNIE SUE BUGG, a citizen of the United States, residing at Roanoke Rapids, in the county of Halifax and State of North Carolina, have invented certain new and useful Improvements in Pan Lifters, of which the following is a specification.

This invention relates to kitchen utensils such as may be used to lift, carry and place pans, plates or similar containers.

The principal objects of the invention are: to provide a pan carrier which will readily slide under the container to be carried without disturbing the contents thereof or necessitating its being lifted by hand; to so form the pan lifter that the pan can be carried safely from place to place without danger of its falling off and without spilling its contents; and to so construct such a pan carrier that it can be used to handle any shaped pan and which is simple in construction and assemblage and is thus quite inexpensive in manufacture.

Other objects and advantages of the invention will appear in the following detailed description, taken in connection with the accompanying drawings, forming a part of this specification, and in which drawings.

In the drawings, where similar characters refer to similar parts throughout the views, A designates the handling rods of the device to which are attached the pan supporting strips B.

Figure 1:
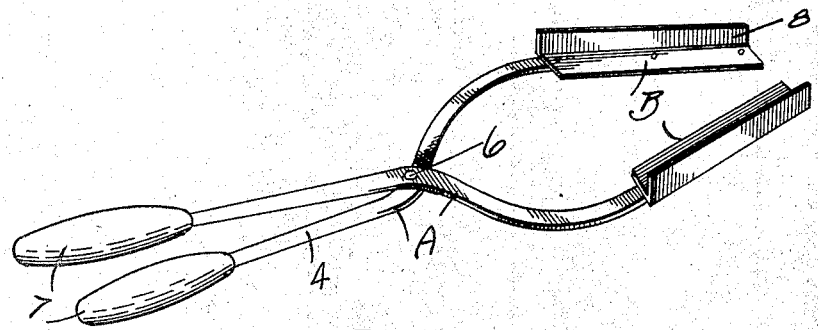
Figure 1 is a perspective view of a pan carrier embodying my invention.
Figure 2:
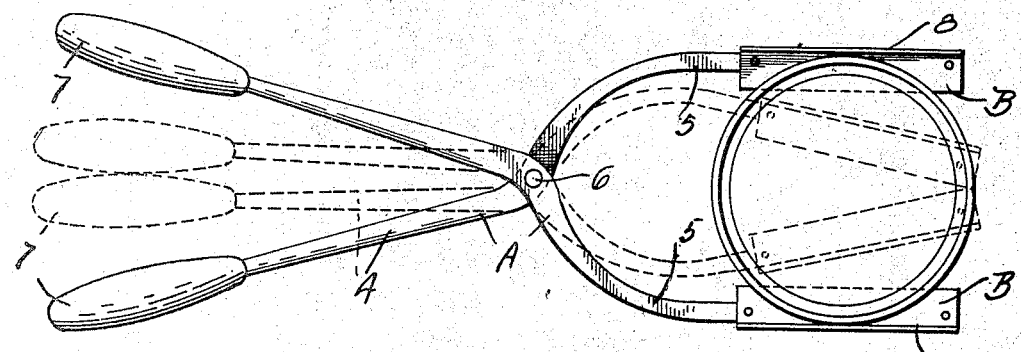
Figure 2 is a plan view showing the device as in use.
Figure 3:
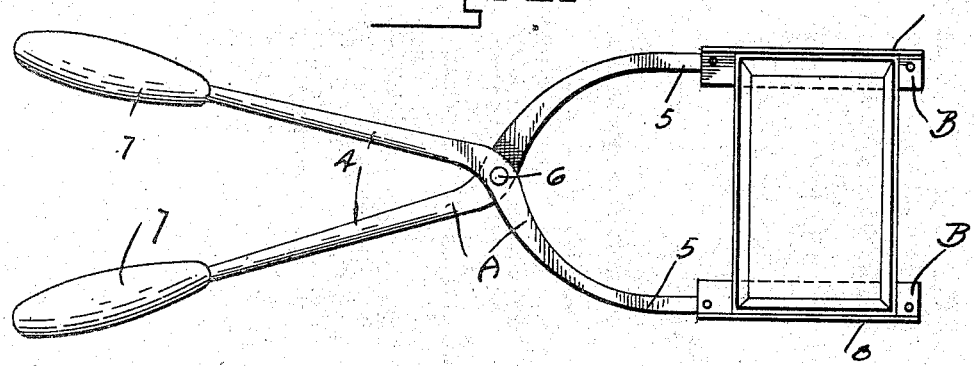
Figure 3 is a plan view showing the device as it appears supporting a differently shaped pan.

The handling rods A are of two pieces of preferably flat metal each of which is straight as at 4 to a point approximately midway of their length where they are curved so that the remaining portions 5 of their length will be offset from, and at an angle of slightly less than 180° to the first named ends. At the aforementioned point approximately midway of their lengths the handles A are crossed so that their curved portions will be opposite and they are there pivotally connected by suitable fastening means such as a rivet 6. Means by which the handles may be grasped are provided at their straight ends 4 where grips 7 of wood or a similar non-heat conducting material encircle the handles.

Pan supporting strips B of straight flat metal having upturned flanges 8 at their outward and opposite sides are attached to the offset ends 5 of the handles A by rivets or any suitable means. When it is desired to move a pan by use of this device the grips 7 are grasped by the hands and are so spaced as to adjust the pan supporting strips B to the size of the pan to be lifted. The strips B being flat, can then be slid under the pan without greatly disturbing the contents of the same or the pan may be placed upon the strips as desired. The pan may then be carried wherever desired and will be held against any horizontal movement by the clamping action of the upturned flanges 8. The pan can be removed from the carrier by resting the ends 5 of the rods A upon the place where the pan is to be positioned and by then moving one of the grips 7 inward thus removing its supporting strip B from beneath the pan and so allowing one side of the pan to drop gently to its proposed position. Then the other strip B can be slid from under the pan. Of course, if practical, the pan may be merely lifted from the supports.

The great advantages of this carrier are that since the outer ends and entire length of the supporting strip B are flat they can easily be slid under any pan and since they are straight they will present some supporting surface to any shaped pan and their upturned flanges 8 will clamp any shaped or sized pan against movement.

It is to be understood that the form of my invention shown and described is to be taken as a preferred example of the same, and that various changes in the shape, size and arrangement of parts may be resorted to without departing from the spirit of the invention or the scope of the subjoined claims:

I claim:

1. A pan carrier including jaw portions having free end portions and movable towards and away from each other, flat pan engaging and supporting strips formed of thin sheet material and secured longitudinally upon the upper faces of the free end portions of the jaws and extending beyond the inner side edges thereof and adapted to extend beneath a pan to be lifted by the carrier, said strips being bent to provide straight flanges extending upwardly from the outer side edge portions for engaging the sides of the pan resting upon the strips and to be lifted by the carrier.

2. A pan carrier comprising a pair of handling rods pivoted together at points substantially midway of their ends to each provide a handle portion at one side of the pivot and a jaw portion at the other side of the pivot of substantially the same length as the handle portion, and an angle shaped pan supporting strip for each rod, each strip including straight flat horizontal and vertical flanges disposed substantially at right angles to each other with the horizontal flanges attached longitudinally upon the jaw portions and disposed in the same plane and the vertical flanges arranged at the outer side edges of the horizontal flanges.

NANNIE SUE BUGG.